(12) United States Patent
Haldimann

(10) Patent No.: US 10,435,179 B2
(45) Date of Patent: Oct. 8, 2019

(54) CAMERA ASSISTED ROBOTIC SYSTEM FOR LOCATING THE END OF A FASTENER EXTENDING THROUGH AN AIRCRAFT PART DURING MANUFACTURE THEREOF

(71) Applicant: ELECTROIMPACT, INC., Mukilteo, WA (US)

(72) Inventor: Ryan P. Haldimann, Seattle, WA (US)

(73) Assignee: Electroimpact, Inc., Mukilteo, WA (US)

( * ) Notice: Subject to any disclaimer, the term of this patent is extended or adjusted under 35 U.S.C. 154(b) by 183 days.

(21) Appl. No.: 15/490,772

(22) Filed: Apr. 18, 2017

(65) Prior Publication Data

US 2018/0297717 A1    Oct. 18, 2018

(51) Int. Cl.

| | |
|---|---|
| B23P 19/06 | (2006.01) |
| B23P 19/10 | (2006.01) |
| B64F 5/10 | (2017.01) |
| G05B 19/402 | (2006.01) |
| B21J 15/14 | (2006.01) |
| B25J 9/16 | (2006.01) |
| B21J 15/02 | (2006.01) |
| B21J 15/28 | (2006.01) |
| B21J 15/32 | (2006.01) |
| G06T 7/00 | (2017.01) |
| G06T 7/70 | (2017.01) |

(Continued)

(52) U.S. Cl.
CPC .............. *B64F 5/10* (2017.01); *B21J 15/022* (2013.01); *B21J 15/142* (2013.01); *B21J 15/28* (2013.01); *B21J 15/32* (2013.01); *B23P 19/06* (2013.01); *B25J 9/1697* (2013.01); *G05B 19/402* (2013.01); *G06T 7/0004* (2013.01); *G06T 7/70* (2017.01); *B23P 19/10* (2013.01); *B64C 1/064* (2013.01); *B64C 1/12* (2013.01); *G05B 2219/40611* (2013.01); *G05B 2219/45091* (2013.01); *G05B 2219/45203* (2013.01); *G06T 2207/10012* (2013.01); *G06T 2207/30164* (2013.01); *G06T 2207/30172* (2013.01)

(58) Field of Classification Search
CPC ........ B21J 15/022; B21J 15/142; B21J 15/28; B21J 15/32; B23P 19/06; B23P 19/10; B25J 9/1697; B64C 1/064; B64C 1/12; B64F 5/10; G05B 19/402; G05B 2219/40611; G05B 2219/45091; G05B 2219/45203; G06T 7/73
See application file for complete search history.

(56) References Cited

U.S. PATENT DOCUMENTS

| 5,125,298 A | * | 6/1992 | Smith | .................. | B23P 19/006 |
| | | | | | 29/798 |
| 5,771,309 A | * | 6/1998 | Yamaoka | ............. | G01B 11/002 |
| | | | | | 348/94 |

(Continued)

*Primary Examiner* — Abdelmoniem I Elamin
(74) *Attorney, Agent, or Firm* — Jensen & Pantigam, P.S.; Clark A. Puntigam

(57) ABSTRACT

A system for locating the center line of a bolt which extends through an aircraft part, including a robot which carries a nut or collar placement device and a stereo camera. A control system operates the camera to produce two images of the fastener at a specified angle. A processor then transforms the image information to control information for the robot to align the nut or collar placement device with the centerline of the fastener and then to place the nut or collar on the end of the fastener.

5 Claims, 5 Drawing Sheets

(51) Int. Cl.
*B64C 1/06* (2006.01)
*B64C 1/12* (2006.01)

(56) References Cited

U.S. PATENT DOCUMENTS

| | | | | |
|---|---|---|---|---|
| 6,163,035 | A * | 12/2000 | Shibayama | G01B 11/00 |
| | | | | 250/559.33 |
| 9,802,319 | B2 * | 10/2017 | Kiyosawa | B25J 9/1697 |
| 2011/0018291 | A1 * | 1/2011 | Osada | B23P 19/001 |
| | | | | 294/65.5 |
| 2011/0022217 | A1 * | 1/2011 | Asamizu | B23P 19/105 |
| | | | | 700/114 |
| 2012/0137522 | A1 * | 6/2012 | Park | B25J 17/0208 |
| | | | | 29/894.3 |
| 2013/0031764 | A1 * | 2/2013 | Sarh | B25J 9/106 |
| | | | | 29/428 |
| 2016/0082557 | A1 * | 3/2016 | Friz | B25B 13/06 |
| | | | | 29/525.02 |
| 2017/0136626 | A1 * | 5/2017 | Wang | G06T 7/74 |
| 2017/0334069 | A1 * | 11/2017 | Wang | B25J 9/1689 |
| 2017/0348852 | A1 * | 12/2017 | Sarh | B25J 9/106 |

* cited by examiner

CAMERA ASSISTED ROBOTIC SYSTEM FOR LOCATING THE END OF A FASTENER EXTENDING THROUGH AN AIRCRAFT PART DURING MANUFACTURE THEREOF

TECHNICAL FIELD

This invention relates generally to the manufacture of large-scale assemblies, such as aircraft assemblies and more specifically to the location of a protruding end of a bolt type fastener which extends through an aircraft or other assembly part during manufacture thereof and then placement of a nut or collar thereon.

BACKGROUND OF THE INVENTION

In the manufacture of large aircraft and parts thereof, such as aircraft fuselages, or other large assemblies, bolt-type fasteners are driven through drilled openings in the fuselage parts for aircraft, specifically into the interior of the fuselage. The threaded end of the bolt extends through the fuselage at selected points along the fuselage. Nuts are then manually positioned and tightened on the threaded portion using a conventional nut placement appliance known as a nut runner. Collars can also be used. This is a slow process and considerable time is consumed in this manual process, which impacts the desired speed of aircraft manufacture. The individual who uses the nut runner must wait for each hole to be successively drilled and each bolt to be then moved therethrough.

Accordingly, it would be advantageous to accomplish the placement of a nut and tightening automatically, or placement and swaging of a collar or rivet, such as through robotic action.

SUMMARY OF THE INVENTION

Accordingly, the present invention is a system for automatically locating the position of the end of a fastener extending through a part during manufacturing of a large scale assembly, comprising: a robot carrying an end effector nut or collar placement device and a camera system; a control system for operating the camera system to capture an image of the fastener from two positions, separated by a selected angle; a processor for processing the image information from the cameras to determine the centerline of the fastener and for providing that information to a robot control system; and a robot control system for moving the nut or collar placement device to align with the centerline of the fastener and for moving the nut or collar placement device so as to place the nut or collar on a protruding end of the fastener.

BEST MODE FOR CARRYING OUT THE INVENTION

As discussed above, in the example of large-scale aircraft manufacturing, such as in the joining of aircraft fuselage parts, bolt fasteners are used which extend through part drilled openings, with a threaded end portion of the bolt being presented on the interior side of the fuselage.

A nut for the fastener is then manually placed on the threaded end of the fastener and tightened by a conventional nut runner device. A nut runner is a conventional appliance, produced by a variety of manufacturers including for example, the Bosch Ergospin Series 3, among others.

In the present invention, nuts are placed on extending ends of bolts automatically by a robotic system. The robotic system is generally shown at 10 in FIG. 1. The robotic system operates on sequentially presented fasteners, one of which is shown at 12 in FIG. 1. The fasteners are conventional bolts of various sizes used in aircraft manufacture, or the manufacture of other large-scale assemblies. In the present application, bolts are used to connect fuselage parts shown generally at 14 which generally comprise fuselage skin sections and interior stringers of commercial aircraft. However, this is one example only. The present invention can be used in other applications involving bolt fasteners and aircraft or aerospace parts as well as with other large-scale manufacturing systems.

Figure 3:
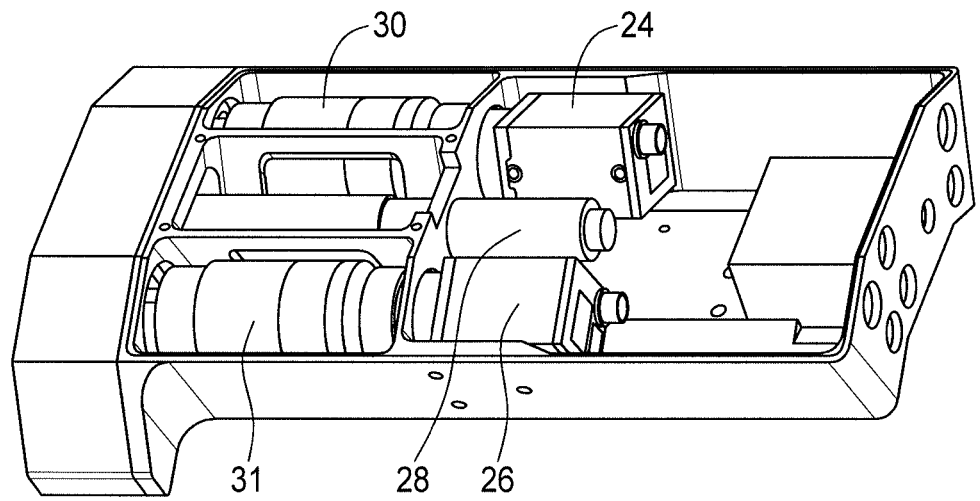
FIG. 3 is a schematic view of one side of a stereo camera used in the present system.
Figure 4:
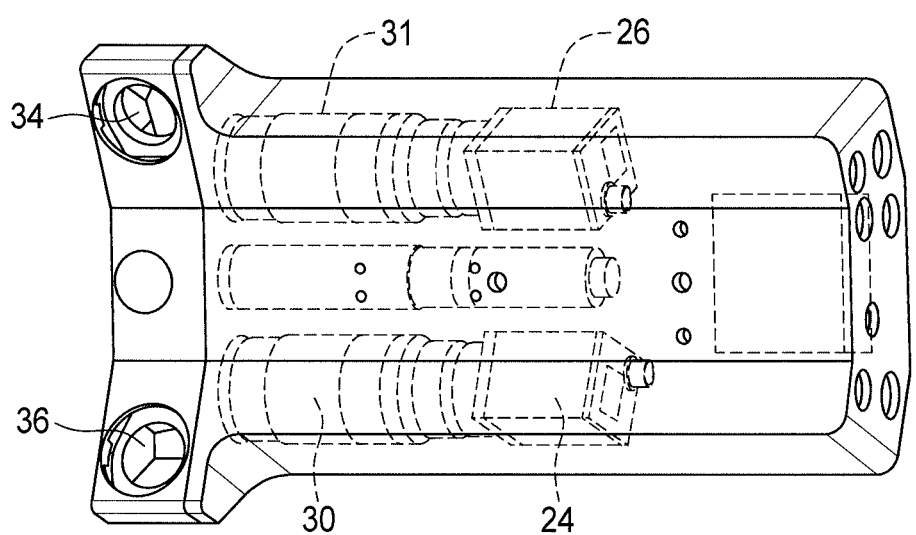
FIG. 4 is a schematic view of an opposing side of the stereo camera.

The robotic system includes a conventional robot, such as one manufactured by KUKA. The KUKA robot shown generally at 16 is a model LBRiiWA or comparable robot having multiple degrees of independent action. It should be understood that robot 16 is conventional; other robots can be used in the present system. Positioned on the forward end of the robot end effector is a conventional nut runner 18. Also attached to the robot is a stereo camera unit shown generally at 20. In the embodiment shown, the cameras used in the stereo camera are conventional, such as an area camera from Basler and Allied Vision Technologies. Other area cameras arranged in a stereo configuration can be used as well. Referring to FIGS. 3 and 4, the stereo camera includes generally two cameras 24, 26, a line laser 28 and associated camera lenses 30 and 31. Each camera has an associated mirror 34 and 36, with LED lighting arranged to produce images at an angle within the range of 15°-165°. Symmetric accuracy is produced at 90° between the two cameras. Again, it should be understood that the components of the stereo camera of FIGS. 3 and 4 are conventional, available from a number of manufacturers.

Figure 1:
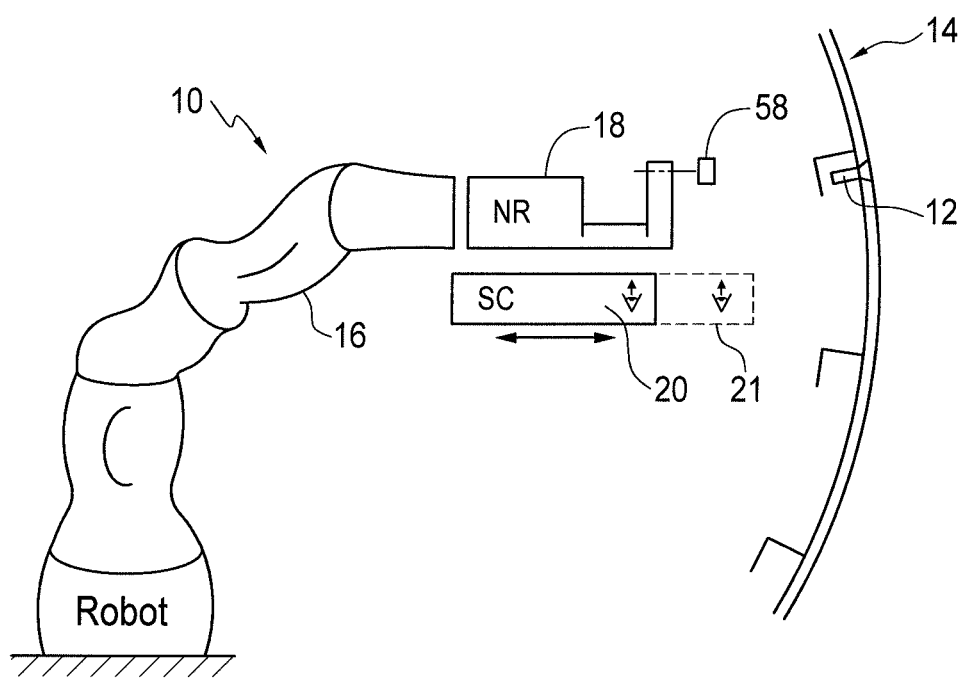
FIG. 1 is a schematic diagram showing components of the present system, namely, a robot element, nut runner and a stereo camera system.
Figure 2:
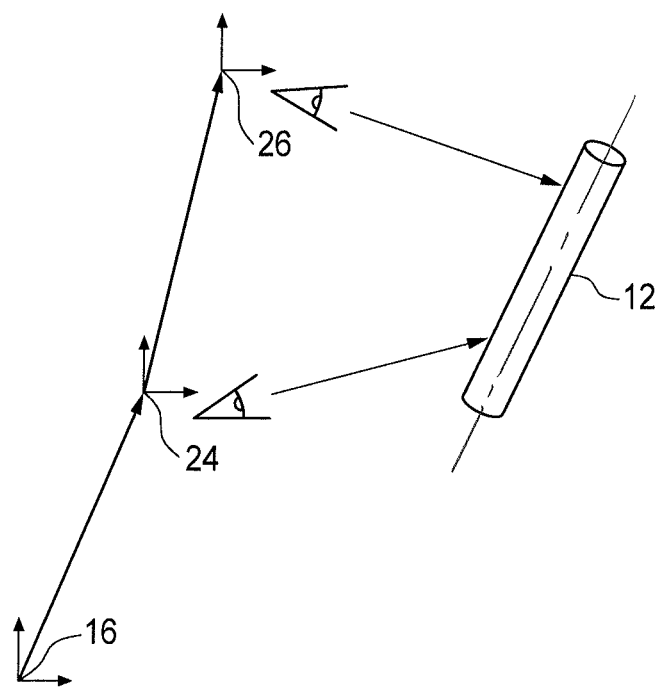
FIG. 2 shows the arrangement of the stereo cameras relative to an extending fastener.
Figure 6:
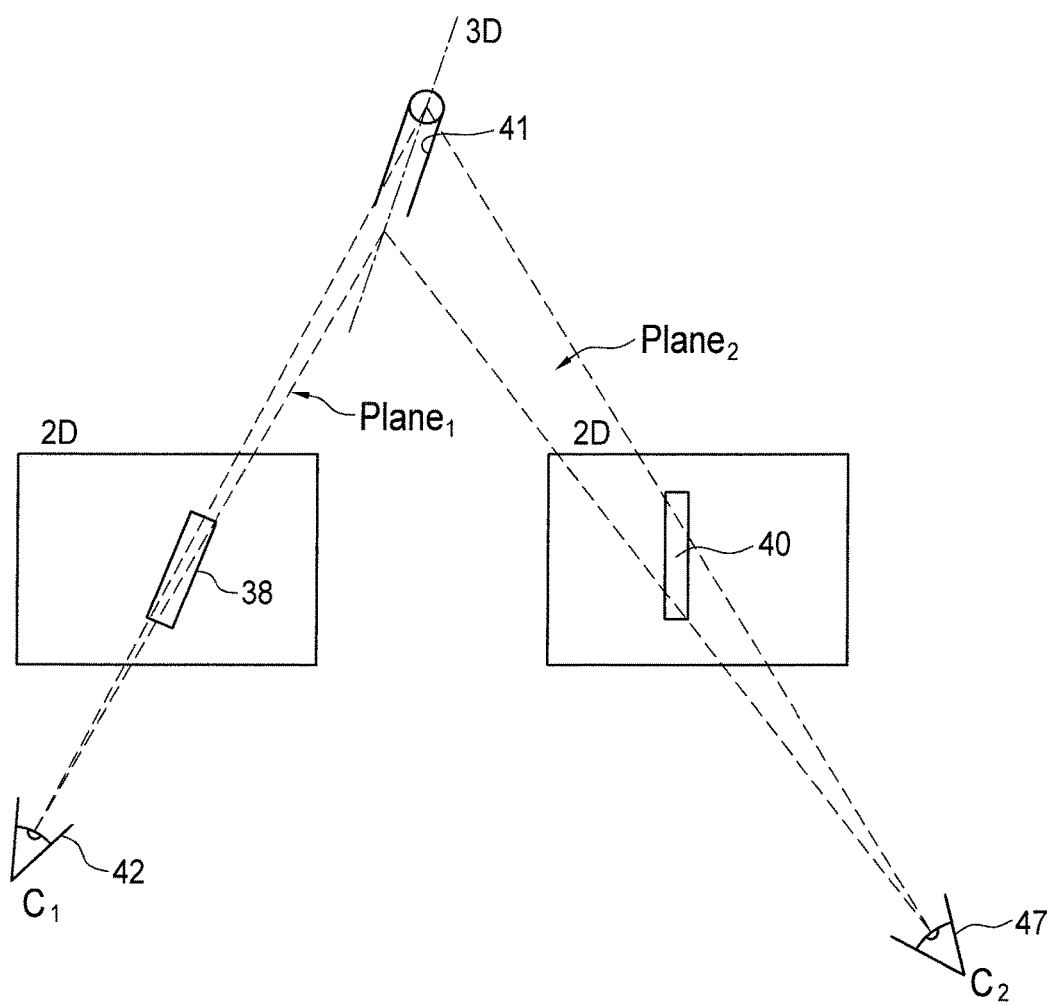
FIG. 6 is a more detailed view of calculating the fastener axis with intersecting planes generated by finding the centerline of the fastener in 2 or 2D images.

FIGS. 1, 2 and 6 show the arrangement of separate cameras 24, 26 (in the stereo camera) relative to the fastener end (FIG. 1) on the robot (FIG. 2). The stereo camera is mounted on the robot so as to move forwardly upon command a distance 21 of 35 mm toward the fuselage, clearing the end of the nut runner 18. Each separate camera 24, 26 is pointed toward the fastener. The cameras are then activated, with each camera producing an image of the protruding end of the fastener, the two images being separated by the selected angle. Each camera produces an image in a 2 dimensional (2D) plane, illustrated in FIG. 6 for instance by planes 38 and 40 relative to fastener 43. Plane 1 image is produced by camera 42 while plane 2 is produced by camera 47.

While in the present embodiment 2 cameras are used as shown in the stereo camera of FIGS. 3 and 4, it should be understood that a single camera can be used with the camera being moved between two positions to provide the desired angle between the two separate images.

Figure 5A:
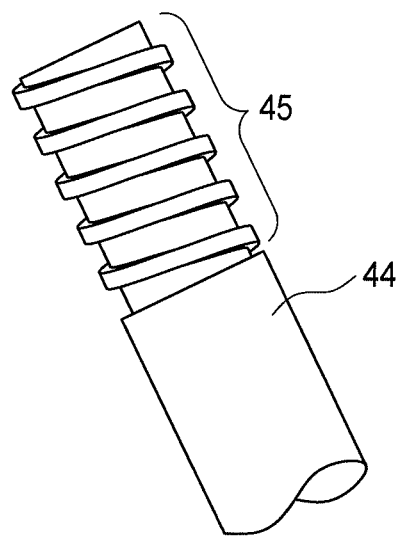
FIG. 5a is a pictorial view of a threaded shank end of a bolt fastener.
Figure 5B:
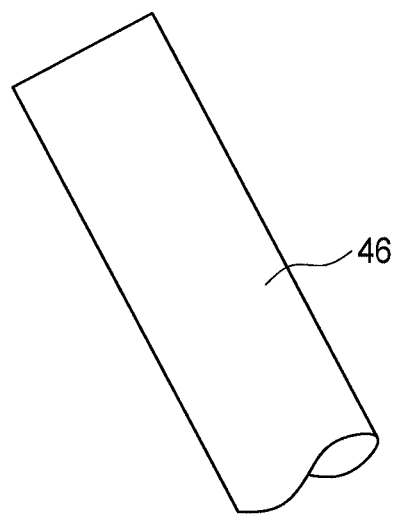
FIG. 5b is a view of the same fastener with threads removed using processing techniques.

The two image planes cross in two-dimensional space at the centerline of the fastener. The initial image produced by each camera is shown in FIG. 5A, with the fastener 44 having threads 45 on the protruding end thereof. The images are then processed to eliminate the thread, leaving an image 46 shown in 5B which permits further processing to produce an accurate indication of the center line of the fastener.

In another embodiment, collars are positioned on and then swaged with unthreaded bolts. There is no requirement of processing to remove threads with this embodiment.

Figure 7:
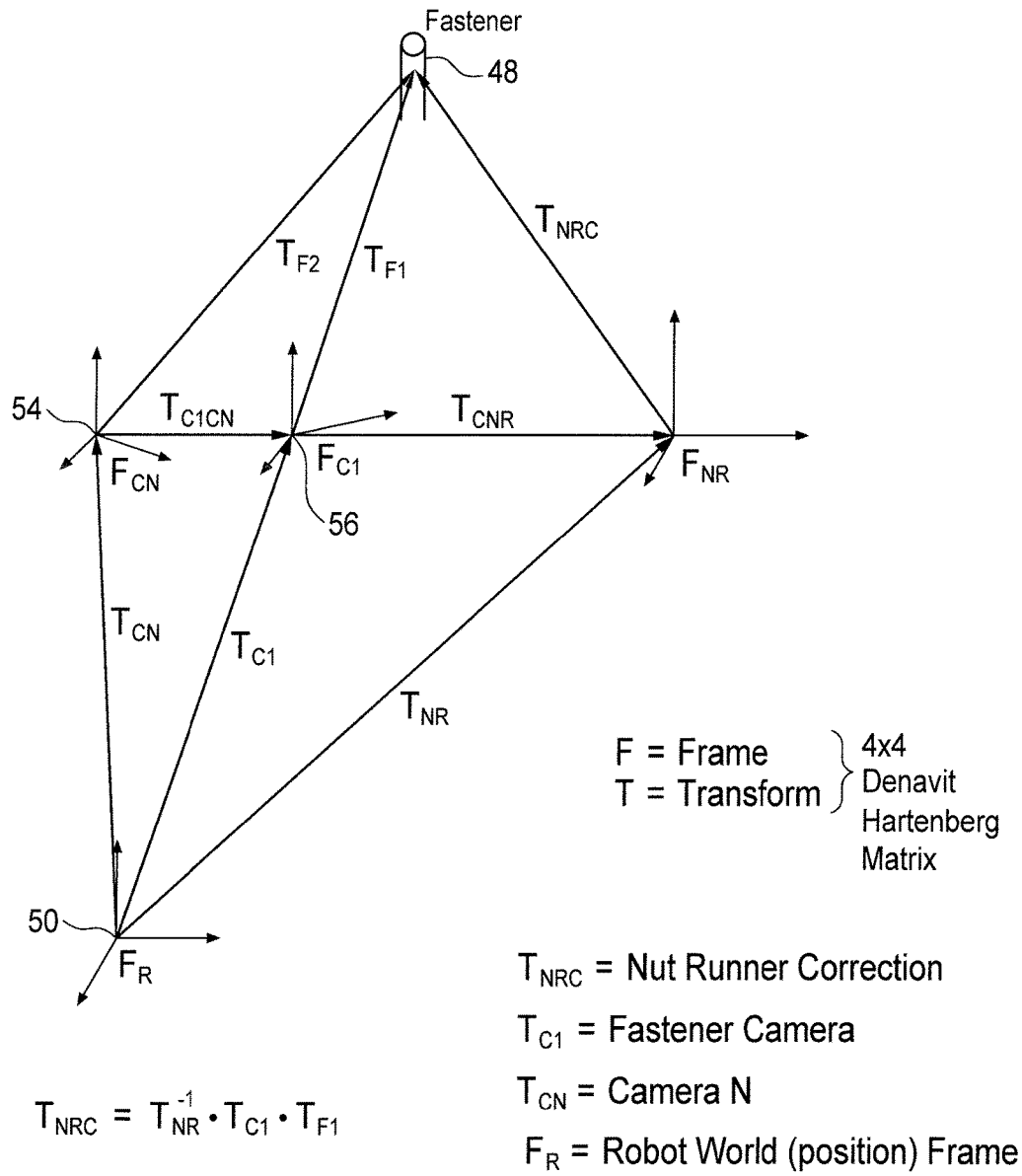
FIG. 7 is a transform diagram illustrating the transform of the information to instructions for the robot nut runner.

The two images are then processed via a conventional correction transformation calculation as generally illustrated in FIG. 7. The fastener position is shown at 48 while the robotic frame is illustrated at 50 with its three dimensional capability. The position of the two spaced cameras in the stereo camera is represented at 54 and 56. The F and T symbols represent frame and transform for a conventional 4×4 Denavit Hartenberg Matrix. $T_{NRC}$ equals the nut runner correction. $T_{C1}$ and $T_{CN}$ represent fastener cameras, $T_{NR}$ represents a nut runner transform and $F_R$ represents the robot frame. The calculation $T_{NRC}=T_{NR}^{-1} \cdot T_{C1} \cdot T_{F1}$ produces the centerline correction information of the fastener, which is then provided to the robot for proper positioning of the nut runner in line with the fastener. The nut runner is then moved forward toward the fastener with a nut 58 thereon, placing the nut on the threaded end of the fastener. The fastener may then be tightened to a required specification by activating the nut runner tool Again, it should be understood that a collar may be placed on the end of the fastener and then swaged.

In operation, as fasteners are moved through successive drilled openings in the fuselage, the robot moves to match the fastener, and operates in accordance with the above to move nuts onto successive bolts. Nuts are provided successively to the nut runner by means of a nut delivery system, typically air powered, which is conventional in such systems.

Typically, the accuracy of the centerline location is approximately 0.010 inches, well within tolerance to place a nut accurately onto a bolt. In the event that a nut (or collar) is not present on the nut runner, or a nut cannot be placed accurately on the fastener, an error signal occurs, which temporarily stops the robotic operation for correction. Once corrected, automatic operation can resume.

Accordingly a system has been described which is capable of locating the center line of successively presented fastener bolts, and for accurately placing a nut (or collar) onto the end of the bolt and tightening or swaging thereof.

Although a preferred embodiment of the invention has been disclosed for purposes of illustration, it should be understood that various changes, modifications and substitutions may be incorporated in the embodiment without departing from the spirit of the invention, which is defined by the claims which follow.

What is claimed is:

1. A system for automatically locating a position of an end of a fastener bolt extending through a part during manufacturing of a large scale assembly, comprising:
    a robot carrying end effector nut or collar placement device and a camera system;
    a control system for operating the camera system to capture an image of the fastener including an image of a protruding end thereof from at least two positions, separated by a selected angle to produce two fastener images;
    a processor for processing the image information from the cameras to determine a centerline of the fastener and for providing that information to a robot control system; and
    the robot control system for moving the end effector nut or collar placement device to align with the centerline of the fastener and for moving the end effector nut or collar placement device so as to place the nut or collar on the protruding end of the fastener;
    wherein a fastener axis is located by intersecting planes of the two fastener images.

2. The system of claim 1, wherein the camera system includes two cameras positioned at a fixed angle therebetween.

3. The system of claim 2 wherein the angle is within the range of 15°-165°.

4. The system of claim 1, wherein the camera system comprises a single camera and wherein the single camera is moved to produce two images separated by a selected angle.

5. The system of claim 1, wherein the processor removes the threads from the bolt image.

* * * * *